United States Patent [19]
Blagg

[11] 3,741,529
[45] June 26, 1973

[54] TRAILER-BORNE HORSE CORRAL
[76] Inventor: Leon Blagg, Flying X Ranch P.O. Drawer H, Bertram, Tex. 78605
[22] Filed: June 6, 1972
[21] Appl. No.: 260,217

[52] U.S. Cl.................. 256/26, 119/20, 296/24 C
[51] Int. Cl............................................ E04h 17/18
[58] Field of Search.................... 256/24, 25, 26; 119/82, 20; 296/24 C

[56] References Cited
UNITED STATES PATENTS

| | | | |
|---|---|---|---|
| 2,869,513 | 1/1959 | Luckett | 119/82 |
| 2,935,965 | 5/1960 | Smith | 119/82 |
| 3,215,118 | 11/1965 | Behlen | 256/25 X |
| 3,648,980 | 3/1972 | Taylor | 256/24 X |

FOREIGN PATENTS OR APPLICATIONS

| | | | |
|---|---|---|---|
| 231,793 | 1/1961 | Australia | 119/20 |
| 683,089 | 11/1952 | Great Britain | 119/20 |

*Primary Examiner*—Dennis L. Taylor
*Attorney*—Ernest R. Archambeau, Jr.

[57] ABSTRACT

In the representative embodiment of the present invention disclosed herein, a uniquely-arranged corral is formed of a plurality of pivotally-intercoupled upright panels which are adapted to be folded together into a compact assembly. In this manner, when the assembly is placed in a typical horse trailer, the trailer interior is appropriately divided into two side-by-side stalls of a comfortable size. On the other hand, when the assembly is unloaded from the trailer, its unique self-supporting arrangement allows the several panels to be easily extended for providing a sturdy, well-proportioned, divided corral of about five times the area occupied by the folded assembly within the trailer.

21 Claims, 5 Drawing Figures

PATENTED JUN 26 1973 3,741,529

PATENTED JUN 26 1973

TRAILER-BORNE HORSE CORRAL

It is, of course, not at all uncommon for the owner of fine horses to periodically transport them to exhibits, races and other events. This is usually accomplished by a typical trailer which is equipped only to transport one or more horses. Thus, upon arrival at the site of the event, the owner is faced with the dual problem of obtaining shelter for himself as well as providing for his horses. Since such events are usually crowded, suitable arrangements for the comfort and well-being of the owner and his animals are often unsatisfactory in one or more respects.

Accordingly, it is an object of the present invention to provide a dual-purpose transportable corral of moderate weight which will alternatively serve to partition a horse trailer as well as to provide an easily-erected enclosure outside of the trailer so that the empty trailer can be used as a camping vehicle.

This and other objects of the present invention are accomplished by providing a light-weight unitary assembly which includes an upright stationary panel having its opposite ends respectively pivotally coupled to first and second sets of upright panels of equal lengths which are pivotally intercoupled together in an end-to-end relationship and respectively adapted for movement between a contracted position defining an enclosure of limited size and an extended position defining a greatly-expanded enclosure. At least one upright panel is cooperatively coupled to about the mid-portion of the stationary panel and extended outwardly therefrom for maintaining the assembly upright as the first and second sets of panels are respectively being moved between their respective extended and folded positions.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

Figure 1:
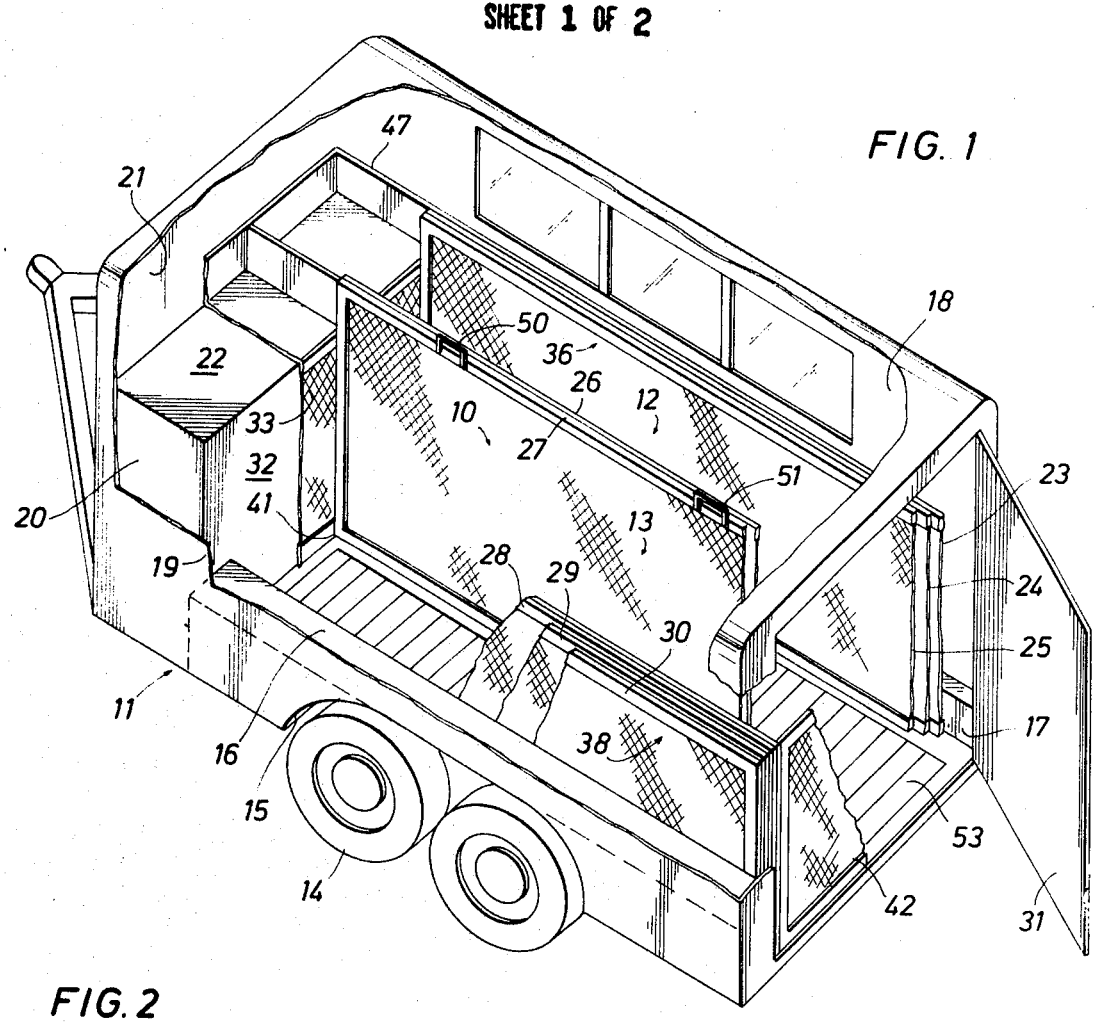
FIG. 1 shows a preferred embodiment of the present invention as it will appear when it is in its contracted position and is being transported in a typical horse trailer.

Turning now to FIG. 1, a preferred embodiment of a transportable corral assembly 10 of the present invention is depicted as it will appear when it is in its fully-contracted position and is in place within a vehicle such as a typical horse trailer 11 to divide the trailer into two side-by-side stalls 12 and 13 of a comfortable size. As is customary, horses (not shown) which are transported in the trailer 11 will stand facing the front (to the left as viewed in FIG. 1) of the trailer. To facilitate the description of the new and improved corral assembly 10, various portions of the assembly as well as of the trailer 11 are either broken away or partially removed in the isometric view of FIG. 1; so it may be necessary to refer to FIG. 2 from time to time to determine the location of these elements of the corral assembly which are either obscured or unillustrated in FIG. 1.

As is known by those skilled in the art, the corral assembly 10 must be arranged so that the stalls 12 and 13 will each safely carry a horse with reasonable comfort as the trailer 11 is pulled at high speeds and, if necessary, over rough roads. Thus, each stall 12 and 13 must be arranged to prevent a horse from falling sideways as well as to limit its forward and rearward movements. It will be appreciated, therefore, that since the contracted corral assembly 10 must be sized to accommodate two horses in the stalls 12 and 13, the particular interior dimensions of the trailer 11 will, in turn, be dictated by the maximum overall length and width of the assembly. For example, should it be desired to recess the wheels 14 of the trailer 11 within wheel wells, as at 15, the lateral or transverse width of the interior of the trailer must, of course, be correspondingly sized to accommodate the required width of the contracted corral assembly 10 between the wheel wells. If this is the case, benches, as at 16 and 17, may be mounted over the wheel wells 15 and extended along each of the side walls 18 and 19 of the trailer, as at 11, to provide seats when the corral assembly 10 is removed from the trailer. On the other hand, if the wheels 14 are not to be enclosed within wheel walls, the interior width of the trailer 11 can be correspondingly reduced to fit the corral assembly 10. In either case, since the overall length of the trailer 11 must be appropriately sized to carry horses of typical sizes, a storage compartment 20 of convenient size can be readily arranged along the front wall 21 of the trailer in the available space below the heads and necks of horses being transported therein. The top 22 of the storage compartment 20 will moreover provide a convenient work space, a kitchen counter, or a sleeping platform when the corral assembly 10 is removed from the trailer 11.

In the preferred embodiment of the corral assembly 10 of the present invention, a group of eight similar or identical upright panels 23–30 are cooperatively arranged to respectively have an overall length sufficient to accommodate a typical-sized horse without leaving much more for forward or backward movement of the horse. Accordingly, the length of each of the panels 23–30 will be substantially equal to the longitudinal distance between the rear door 31 of the trailer 11 and the rear wall 32 of the storage compartment 20 at the front of the trailer. A single transverse panel 33 having an overall length substantially equal to the desired width of the corral assembly 10 (i.e., the lateral spacing between the benches 16 and 17 in the trailer 11) is positioned uprightly along the rear wall 32 of the storage compartment 20.

Figure 2:
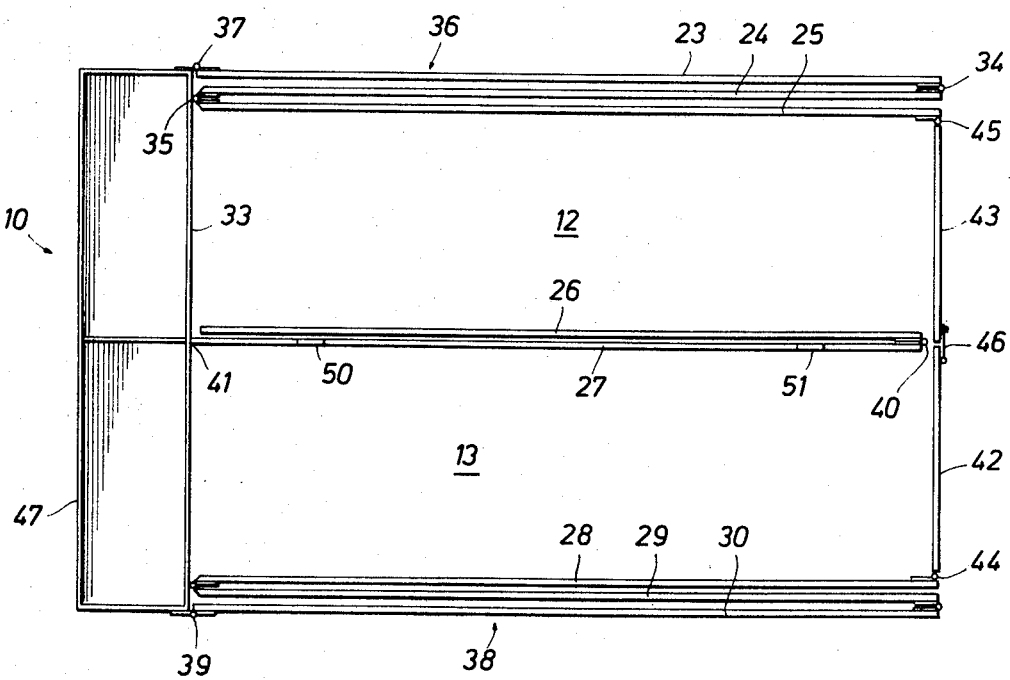
FIG. 2 is a somewhat-enlarged plan view of the transportable corral assembly depicted in FIG. 1 after it has been unloaded and is ready for extension to its expanded position.

As illustrated in FIGS. 1 and 2, three of the longer panels 23–25 are pivotally coupled together in an end-to-end fashion, as by one or more hinges 34 and 35 at their adjacent ends, to form a first set 36 of interhinged panels adapted to be positioned uprightly along the interior of the trailer wall 18. This first set 36 of panels are pivotally coupled to one end of the shorter transverse panel 33 by one or more hinges, as at 37, which are connected between the shorter panel and the forward end of the panel 23. The three panels 28–30 are arranged similarly to the first set 36 of panels for providing a second set 38 of interhinged panels which are, however, adapted to be positioned uprightly along the other trailer wall 19 and are pivotally connected to the other end of the panel 33 by hinges, as at 39, interconnecting the shorter panel and the forward end of the longer panel 30. The remaining two longer upright panels 26 and 27 are hinged together, as at 40, at their adjacent rearward ends; and, for reasons which will subsequently become apparent, the forward end of the longer panel 27 is coupled by a sturdy pivotal connection or, preferably, by a rigid connection, such as a weld 41, to the approximate mid-portion of the shorter panel 33.

Although a single panel would suffice, it is preferred to provide two upright panels 42 and 43 of similar or identical length which are respectively hinged, as at 44 and 45, to the rear ends of the longitudinal panels 28 and 25 and adapted for closure against the rearward ends of the two intermediate panels 26 and 27, with a latch, such as at 46, keeping the two short panels closed. As illustrated, the combined lengths of the two short panels 42 and 43 is about equal to the overall length of the single forward transverse panel 33.

In the preferred embodiment of the corral assembly 10, a feed trough 47 is cooperatively arranged along the upper edge of the forward panel 33. Since the trailer 11 includes a forward storage compartment, as at 20, it is, of course, convenient to arrange the feed trough 47 to extend just above the compartment top 22 when the corral 10 is disposed within the trailer.

Figure 3:
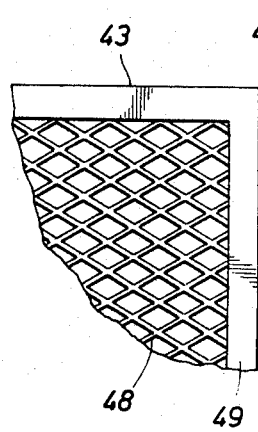
FIG. 3 is a greatly-enlarged view of a portion of the preferred embodiment of the present invention showing certain constructional details.
Figure 3:
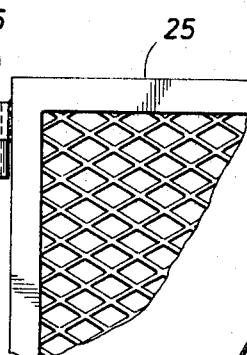

As will subsequently be appreciated, it is preferred that the combined corral assembly 10 have the least-possible amount of weight commensurate with the strength of the corral assembly. Thus, it is advisable to fabricate the several panels 23–30, 33, 42 and 43 as illustrated in FIG. 3. As seen there, the panels 25 and 43, for example, are respectively formed of sheets of expanded metal 48 which are bounded by a rectangular metal frame formed of materials such as lengths of a metal tubing 49 or the like. It will, of course, be appreciated that this type of construction will provide substantial rigidity to the overall corral assembly 10 with a minimum of weight.

One preferred form of construction is to employ sheets of commercially-available 13-gage thick expanded metal having 1-½-inch × 3-inch diamonds, with these sheets being welded within a rectangular frame of a typical structural member such as ¾-inch or 1-inch square metal tubing. The lengths of the several panels in the corral assembly 10 will, of course, be sized as previously discussed. Where horses of a typical size are to be primarily hauled in the trailer 11, it is preferred to arrange the panels to position their upper edges at about 5-feet above the floor. Experience has shown that a typically-sized corral assembly 10 of the present invention constructed in this manner will weigh no more than about 400 to 500-pounds so that two or three men can load and unload the assembly from the trailer 11 without undue effort. However, although the corral assembly 10 can be unloaded manually, it is preferred to include one or two lifting eyes, as at 50 and 51, along the top edge of the intermediate stationary panel 27 so that a light-weight hoist (not shown) carried on a longitudinal rail (not shown) mounted along the top of the trailer 11 can be employed. Although panels of full height are illustrated, it will be appreciated that some or all of the several panels of the assembly 10 can also be constructed in the form of rectangles of less height which respectively have two or more depending legs of sufficient length to maintain the upper edges of the panels at a selected height.

In any event, the usual practice is to first remove the animals from their respective stalls 12 and 13 and position the rear of the trailer 11 at the location where the corral assembly 10 is to be set up. The floor mats 52 and 53 are removed and the two door panels 42 and 43 latched together to add rigidity to the assembly 10 as it is being unloaded. Once the rear of the corral assembly 10 is resting on the ground, the trailer 11 can be pulled slowly forward to complete the withdrawal of the assembly from the trailer.

Figure 4:
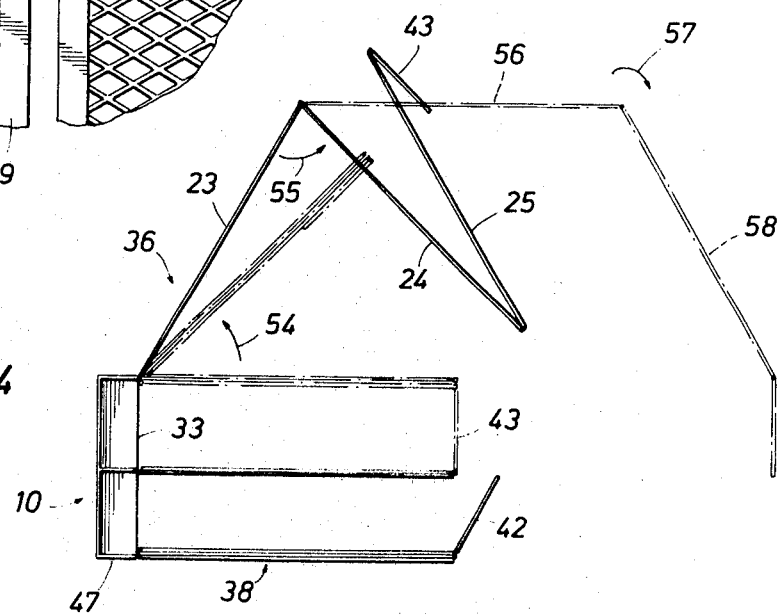
FIG. 4 is a substantially-reduced plan view of the corral assembly as it is being extended from its contracted position shown in FIG. 2.

As best seen in FIG. 4, once the corral assembly 10 is setting on the ground, the rear panels 42 and 43 are unlatched. Then, one set of panels, such as at 36, is swung outwardly in relation to the panel 33 through an arc of about 60° (as shown by the arrow 54) to place the first panel 23 in the set in the illustrated full-line position. Once the panel 23 is properly positioned, the remaining two panels 24 and 25 in the set 36 are swung together in the direction shown by the arrow 55 until they are both substantially parallel to the longitudinal axis of the assembly 10 so as to position these panels as illustrated by the dashed lines 58. Thereafter, the last panel 25 in the set 36 is swung (as indicated by the arrow 57) back around to place it in the dashed-line position depicted at 58.

Figure 5:
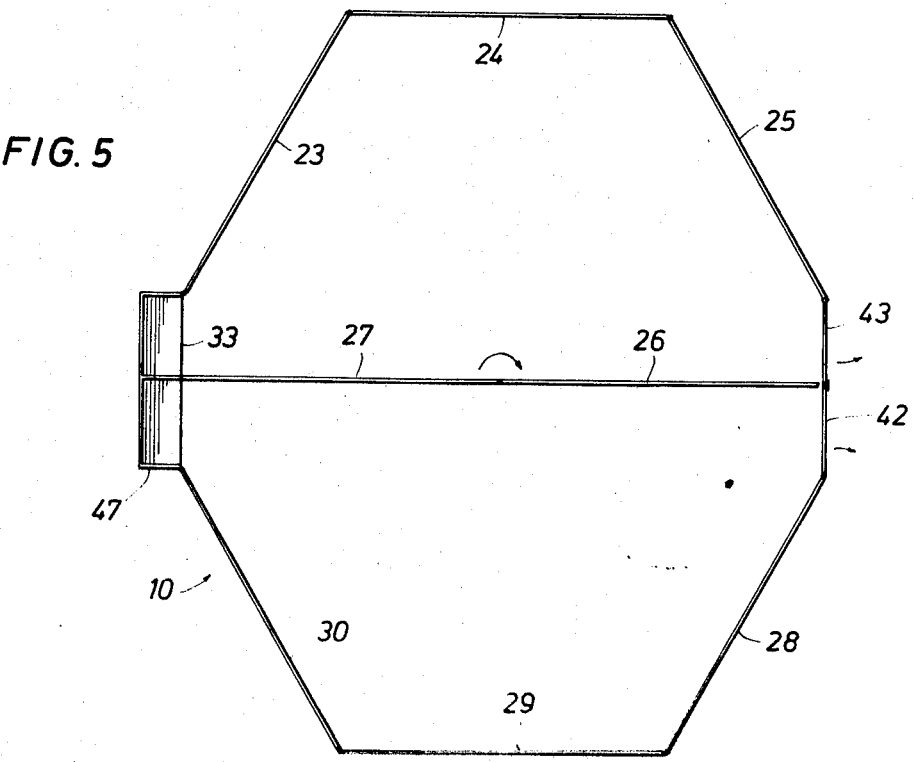
FIG. 5 is similar to FIG. 4 but shows the new and improved corral assembly as it will appear when it is fully extended to its expanded position.

Once the first set 36 of panels is positioned as illustrated in FIG. 4, the second set 38 of panels is swung out in a similar fashion so as to successively position them as illustrated in FIG. 5. Once this is accomplished, the movable intermediate panel 26 is pivoted back around from its folded position alongside the fixed panel 27 until it is fully extended as shown in FIG. 5. This will complete the extension of the corral 10 to its illustrated fully-extended position. The corral 10 of the present invention is, of course, returned to its contracted position by reversing the above-described procedure.

Several points of interest should be considered. First of all, of paramount significance to the present invention, it must be appreciated that the transverse forward panel 33 and the intermediate stationary panel 27 are cooperatively coupled to one another for maintaining the corral assembly 10 in an upright position at all times. By virtue of this unique arrangement of the two intersecting stationary panels 27 and 33, the corral assembly 10 is always well supported even as the two sets 36 and 38 of panels are being unfolded to their extended positions or are being refolded to their contracted positions. The advantages of this arrangement are, of course, readily apparent. Of further interest, it will be appreciated that depending upon the position of the intermediate swinging panel 26, the corral 10 can be alternately arranged so as to define either one large enclosure or two divided areas of comfortable size, with the two gate panels 42 and 43 permitting selective access to the enclosure in either case. It should also be noted that by arranging the panels to have an overall height of about 5-feet, an average-sized horse cannot reach over the corral assembly 10 and possibly bend the panels.

Accordingly, it will be appreciated that the new and improved corral assembly of the present invention enables a horse owner to conveniently transport his animals and then quickly provide for their welfare and control as well as his own comfort with a minimum of effort. By virtue of the two intersecting stationary panels, the two sets of pivotally-intercoupled panels coupled thereto can be readily moved to their respective positions without the assembly falling over.

While only a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A vehicularly-transportable animal corral adapted to be alternatively contracted for confining animals on a vehicle having a given length and width and to be expanded for enclosing animals away from such a vehicle and comprising:
   a plurality of first and second upright wall-defining members respectively having a length no greater than said given vehicle length;
   first and second means respectively linking said first and second wall-defining members into first and second tandem sets for defining first and second foldable side enclosure walls where said wall-defining members in each tandem set are cooperatively arranged for selective placement either in a folded position with said wall-defining members in each of said sets placed side-by-side in a parallel relationship with one another or in an unfolded position with said wall-defining members in each of said sets placed end-to-end in an extended relationship with one another; and
   means cooperatively arranged for maintaining said first and second side walls uprightly as said first and second wall-defining members are respectively being moved between said folded and unfolded positions and including at least a third upright wall-defining member defining a front enclosure wall having a length no greater than said given vehicle width, means pivotally intercoupling the ends of said front enclosure wall respectively to the forward free end of the first one of said first wall-defining members in said first set and to the forward free end of the first one of said second wall-defining members in said second set, and at least one supporting member operatively coupled to said front enclosure wall and extending rearwardly therefrom for supporting said enclosure walls in their respective upright positions.

2. The transportable animal corral of claim 1 further including:
   means including at least a fourth upright wall-defining member defining a rear enclosure wall cooperatively arranged between the rearward free end of the last one of said first wall-defining members in said first set and the rearward free end of the last one of said second wall-defining members in said second set for providing controlled access to the space bounded by said enclosure walls.

3. The transportable animal corral of claim 1 wherein there is an equal number of said first and second wall-defining members in said first and second sets.

4. The transportable animal corral of claim 1 wherein the length of each of said first and second wall-defining members is substantially equal to said given vehicle length.

5. The transportable animal corral of claim 4 wherein there are at least three of said first wall-defining members in said first set and at least three of said second wall-defining members in said second set.

6. The transportable animal corral of claim 1 wherein the length of said third wall-defining member is substantially equal to said given vehicle width.

7. The transportable animal corral of claim 1 wherein said supporting member is a fourth upright wall-defining member having a length substantially equal to said given vehicle length and defining a rearwardly-extending partition wall about midway between said first and second side enclosure walls.

8. The transportable animal corral of Claim 7 further including:
   a fifth upright wall-defining member having a length substantially equal to said given vehicle length; and
   means pivotally coupling the rearward end of said fourth wall-defining member to one end of said fifth wall-defining member for cooperatively arranging said fifth wall-defining member to be selectively positioned in a side-by-side relationship with said fourth wall-defining member when said first and second side enclosure walls are in their said folded positions and to be selectively positioned in an end-to-end relationship with said fourth wall-defining member when said first and second side enclosure walls are in their said unfolded positions to divide the space bounded by said enclosure walls.

9. The transportable animal corral of claim 8 further including:
   sixth and seventh upright wall-defining members respectively having a length substantially equal to half of said given vehicle width;
   means pivotally coupling one end of said sixth wall-defining member to the rearward free end of the last one of said first wall-defining members in said first set for providing controlled access to the divided space between said first side enclosure wall and said fourth and fifth wall-defining members;
   means pivotally coupling one end of said seventh wall-defining member to the rearward end of the last one of said second wall-defining members in said second set for providing controlled access to the divided space between said second side enclosure wall and said fourth and fifth wall-defining members; and
   means operatively latching the other ends of said sixth and seventh wall-defining members to one another.

10. A transportable horse corral adapted to be alternatively contracted for confining at least two horses side-by-side within a vehicular horse trailer having a given interior length and interior width and to be expanded for enclosing at least one of such horses away from such a trailer and comprising:
   a group of at least six upright panels respectively having a length no greater than said given interior length;
   first pivot means linking the adjacent ends of three of said panels to one another for arranging said three panels into a first foldable side enclosure wall alternatively adapted for selective placement either in a folded position with said three panels in a side-by-side parallel relationship or in an unfolded position with said three panels in an end-to-end extended relationship;

second pivot means linking the adjacent ends of three others of said panels to one another for arranging said three other panels into a second foldable side enclosure wall alternatively adapted for selective placement either in a folded position with said other three panels in a side-by-side parallel relationship or in an unfolded position with said other three panels in an end-to-end extended relationship;

a shorter upright panel having a length no greater than said given interior width;

third pivot means respectively linking one end of said shorter panel to the forward free end of the first of said three panels and the other end of said shorter panel to the forward free end of the first of said other three panels for defining a front enclosure wall; and supporting means cooperatively coupled to said shorter panel for supporting said panels uprightly as said first and second side walls are respectively being moved between their said folded and unfolded positions.

11. The transportable corral of claim 10 wherein the length of each of said six panels is about equal to said given interior length.

12. The transportable corral of claim 10 wherein said supporting means include:
a seventh upright panel having a length no greater than said given interior length; and
means cooperatively coupling the forward end of said seventh panel to about the mid-point of said shorter panel to position said seventh panel rearwardly thereof and between said first and second side walls for alternatively dividing the space therebetween when said first and second side walls are respectively in their said folded positions and supporting said panels uprightly as said first and second side walls are respectively being moved between their said folded and unfolded positions.

13. The transportable corral of claim 12 wherein said means cooperatively coupling said forward end of said seventh panel to said shorter panel include means rigidly securing said seventh panel at about a right angle to said shorter panel for dividing said space into approximately-equal portions defining individual horse stalls when said side walls are respectively in their said folded positions.

14. The transportable corral of claim 12 further including:
an eighth upright panel having a length no greater than said given interior length; and
third pivot means linking one end of said eighth panel to the rearward end of said seventh panel for movement to a position separating one space within said side walls from another space therebetween when said side walls are respectively in their said unfolded positions.

15. The transportable corral of claim 14 wherein the length of each of said eight panels is about equal to said given interior length.

16. The transportable corral of claim 10 further including:

first and second gate members respectively having a length no greater than about one-half of said given interior width;

first gate pivot means cooperatively pivoting one end of said first gate member to the rearward free end of the third of said third panel; and second gate pivot means cooperatively pivoting one end of said second gate member to the rearward free end of the third of said other three panels.

17. Apparatus adapted for alternatively transporting and penning at least two horses and comprising:

a first group of at least six upright panels respectively having a length equal to a first predetermined dimension;

first pivot means linking the adjacent ends of a first set of one-half of said first group of panels to one another for tandemly arranging said first set of panels as a first foldable side enclosure wall for alternative placement either in a folded position with said first set of panels in a side-by-side parallel relationship or in an unfolded position with said first set of panels in an end-to-end extended, somewhat C-shaped, relationship;

second pivot means linking the adjacent ends of a second set of one-half of said first group of panels to one another for tandemly arranging said second set of panels as a second foldable side enclosure wall for alternative placement either in a folded position with said second set of panels in a side-by-side parallel relationship or in an unfolded position with said second set of panels in an end-to-end extended, somewhat C-shaped, relationship;

a seventh upright panel having a length equal to a second predetermined dimension;

third pivot means respectively linking one end of said seventh panel to the forward end of the first panel in said first set of panels and the other end of said seventh panel to the forward end of the first panel in said second set of panels for defining a front enclosure wall;

a second group of at least two upright panels respectively having a length equal to said first predetermined dimension;

fourth pivot means linking the adjacent ends of said second group of panels to one another for tandemly arranging said second group of panels as a foldable partition wall for selective placement either in a folded position with said second group of panels in a side-by-side parallel relationship or in an unfolded position with said second group of panels in an end-to-end extended relationship;

means cooperatively coupling the forward end of the first one of said second group of panels to about the mid-point of said seventh panel to position said second group of panels rearwardly of said front wall and between said first and second side walls for alternatively dividing the space therebetween into two stalls when said first and second side walls are respectively in their said folded positions and supporting said panels uprightly as said first and second side walls are being moved respectively between their said folded and unfolded positions; and an enclosed vehicular trailer having an interior length and interior width respectively no less than said first and second predetermined dimensions for transporting said interconnected panels with said side and partition walls respectively in their said folded positions, said trailer further having a rear access opening with a width no less than said second predetermined dimension for allowing removal of said interconnected panels from said trailer before said side and partition walls are respectively moved to their said unfolded positions.

18. The apparatus of claim 17 further including:
first and second gate members respectively having a length substantially equal to about one-half of said second predetermined dimension;
first gate pivot means cooperatively pivoting one end of said first gate member to the rearward end of the last panel in said first set of panels; and
second gate pivot means cooperatively pivoting one end of said second gate member to the rearward end of the last panel in said second set of panels.

19. The apparatus of claim 18 wherein there are only six of said panels in said first group of panels and only two of said panels in said second group of panels so that when said first and second side walls are respectively in their said unfolded positions they will cooperate with said front wall and said first and second gate members to bound an approximate octagonal space and when said partition wall is in its said unfolded position it will substantially bisect said octagonal space.

20. The apparatus of claim 17 further including: a feed trough mounted on said front wall.

21. The apparatus of claim 17 wherein said means cooperatively coupling said forward end of said first one of said second group of panels to said seventh panel include means rigidly securing said first one of said second group of panels to said seventh panel.

* * * * *